US012654337B2

(12) United States Patent
Liu et al.

(10) Patent No.: US 12,654,337 B2
(45) Date of Patent: Jun. 16, 2026

(54) ROBOTIC END EFFECTORS AND ROBOTIC FINGERS THEREOF

(71) Applicant: Hong Kong Centre for Logistics Robotics Limited, Hong Kong (CN)

(72) Inventors: Yunhui Liu, Hong Kong (CN); Jianshu Zhou, Hong Kong (CN); Hanwen Cao, Hong Kong (CN); YiChuan Li, Hong Kong (CN); Tsz Fung Au, Hong Kong (CN)

(73) Assignee: HONG KONG CENTRE FOR LOGISTICS ROBOTICS LIMITED, Hong Kong (CN)

( * ) Notice: Subject to any disclaimer, the term of this patent is extended or adjusted under 35 U.S.C. 154(b) by 1032 days.

(21) Appl. No.: 17/807,864

(22) Filed: Jun. 20, 2022

(65) Prior Publication Data

US 2023/0405841 A1    Dec. 21, 2023

(51) Int. Cl.
*B25J 15/08* (2006.01)

(52) U.S. Cl.
CPC .................................... *B25J 15/08* (2013.01)

(58) Field of Classification Search
CPC ...... B25J 15/08; B25J 15/0028; B25J 15/026; B25J 15/10; B25J 15/0616
See application file for complete search history.

(56) References Cited

U.S. PATENT DOCUMENTS

| | | | |
|---|---|---|---|
| 8,936,289 B1* | 1/2015 | Kozlowski | B25J 19/0091 |
| | | | 901/45 |
| 9,533,419 B1* | 1/2017 | Strauss | B25J 15/0009 |
| 10,556,338 B1* | 2/2020 | Marchese | B25J 15/0475 |
| 10,682,770 B1* | 6/2020 | Lilliston, III | B25J 17/0241 |
| 2014/0197652 A1* | 7/2014 | Wang | B25J 15/0009 |
| | | | 294/185 |
| 2016/0089793 A1* | 3/2016 | Truebenbach | G01R 31/2834 |
| | | | 324/750.25 |
| 2020/0078959 A1* | 3/2020 | Sakakibara | B25J 15/028 |

FOREIGN PATENT DOCUMENTS

| | | | | |
|---|---|---|---|---|
| CN | 106041976 A | * | 10/2016 | B25J 15/12 |

OTHER PUBLICATIONS

CN-106041976-A—Google Patents English Translation, 2016.*
(Continued)

*Primary Examiner* — Stephen A Vu
(74) *Attorney, Agent, or Firm* — EAGLE IP LIMITED

(57) ABSTRACT
In one aspect, provided is a robotic end effector, comprising a palm; a plurality of robotic fingers that are operatively connected to the palm, each finger comprising: a finger base having a proximal end portion that is operatively connected to the palm and an opposing, distal end portion; and a suction cup, wherein each of the plurality of fingers is operatively connected to the palm at the proximal end portion and is configured to be rotatable and/or movable relative to the palm, and wherein the suction cup is configured to be movable about a pivot of the distal end portion. Other example embodiments are described herein. In certain embodiments, the disclosure provides a versatile, multi-modal robotic end effector for grasping with enhanced picks per hour (PPH).

16 Claims, 12 Drawing Sheets

(56)        References Cited

OTHER PUBLICATIONS

Chagouri et al., Product Design Journey: Novel Tool Changer, Proceedings of the ASME 2021 International Mechanical Engineering Congress and Exposition, Nov. 1-5, 2021.

Chin et al., Multiplexed Manipulation: Versatile Multimodal Grasping via a Hybrid Soft Gripper, 2020 IEEE International Conference on Robotics and Automation (ICRA), May 31 Aug. 31, 2020, pp. 8949-8955.

Hasegawa et al., A Three-Fingered Hand with a Suction Gripping System for Picking Various Objects in Cluttered Narrow Space, 2017 IEEE/RSJ International Conference on Intelligent Robots and Systems (IROS), Sep. 24-28, 2017, pp. 1164-1171.

Hasegawa et al., Detecting and Picking of Folded Objects with a Multiple Sensor Integrated Robot Hand, 2018 IEEE/RSJ International Conference on Intelligent Robots and Systems (IROS), Oct. 1-5, 2018, pp. 1138-1145.

Hasegawa et al., GraspFusion: Realizing Complex Motion by Learning and Fusing Grasp Modalities with Instance Segmentation, May 20-24, 2019, pp. 7235-7241.

Liu et al., Hybrid Robotic Grasping with a Soft Multimodal Gripper and a Deep Multistage Learning Scheme, arXiv, Feb. 28, 2022.

Mazzolai et al., Octopus-Inspired Soft Arm with Suction Cups for Enhanced Grasping Tasks in Confined Environments, Advanced Intelligent Systems, 2019, vol. 1, No. 6, 19000041.

Nakamoto et al., A Gripper System for Robustly Picking Various Objects Placed Densely by Suction and Pinching, 2018 IEEE/RSJ International Conference on Intelligent Robots and Systems (IROS), Oct. 1-5, 2018, pp. 6093-6098.

Townsend, The BarrettHand grasper—programmably flexible part handling and assembly, Industrial Robot, vol. 27, No. 3, pp. 181-188.

Wade-McCue et al., Design of a Multi-Modal End-Effector and Grasping System: How Integrated Design helped win the Amazon Robotics Challenge, arXiv, Jun. 19, 2018.

Zeng et al., Robotic Pick-and-Place of Novel Objects in Clutter with Multi-Affordance Grasping and Cross-Domain Image Matching, The International Journal of Robotics Research, 2019, Vo. 41, No. 7, 2022.

* cited by examiner

3000

3200

3226B

3400D

3400C

3421C

3421D

3226A

3400A

3400B

3421A

3421B

4000

4000

4000

4000

4000

4000

4000

4000

4000

4000

4000

ROBOTIC END EFFECTORS AND ROBOTIC FINGERS THEREOF

FIELD OF INVENTION

This application relates to robotic devices. More specifically, the present invention relates to robotic fingers and robotic end effectors comprising the same for grasping objects.

BACKGROUND OF INVENTION

Reliable robotic grasping of objects can benefit various applications such as warehouse and e-commerce order fulfillment. However, it is a great challenge for grasping objects of a diverse range of shapes, textures and sizes due to the inherent limitations in each type of robotic end effectors. Therefore, an improved, versatile robotic end effector that can handle diverse range of objects with enhanced picks per hour (PPH) is highly desired.

SUMMARY OF INVENTION

In light of the foregoing background, in certain embodiments, it is an object to provide improved robotic fingers and robotic end effectors, systems thereof, uses thereof and methods of making the same.

Accordingly, in one aspect, provided is a robotic end effector, comprising: a palm and a plurality of robotic fingers that are operatively connected to the palm. Each finger comprises a finger base and a suction cup. The finger base has a proximal end portion that is operatively connected to the palm and an opposing, distal end portion. Each of the plurality of fingers is operatively connected to the palm at the proximal end portion and is configured to be rotatable and/or movable relative to the palm. The suction cup is configured to be movable about a pivot of the distal end portion.

In another aspect, provided is a robotic end effector for grasping an object, comprising: a palm and a plurality of robotic fingers that are operatively connected to the palm to form a parallel jaw gripper. Each finger comprises a finger base having proximal end portion that is operatively connected to the palm and an opposing, distal end portion; and a suction cup connected to the distal end portion by a revolute joint. The suction cup is configured to be movable about an axial axis of a pivot of the distal end portion. Each of the plurality of fingers is operatively connected to the palm at the proximal end portion and is configured to be movable relative to the palm. Each of the plurality of fingers is configured to be slidable along a transverse axis substantially perpendicular to the axial axis of the pivot of the corresponding suction cup.

In another aspect, provided is a robotic finger for a palm of a robotic end effector, comprising a finger base having a proximal end portion that is operatively connected to the palm and an opposing, distal end portion; and a suction cup. The finger base is configured to be rotatable and/or movable relative to the palm, and the suction cup is configured to be movable about a pivot of the distal end portion.

Other example embodiments will be described below.

There are many advantages to the present disclosure.

In certain embodiments, the present disclosure provides a versatile end effector which combines multi-modal robotic fingers with a robotic palm via joints. The joint can be prismatic joint, revolute joint, or hybrid joint. Each multi-modal robotic finger contains a finger base that can rotate or displace relative to the palm and a suction cup that is connected to the end tip of the finger base by a revolute joint. This allows the end effector to transition between multiple grasping modes (for example, parallel grasping, single-suction, multiple-suction, pinching-with-suction, unpinching-with-suction) easily. The mode transition allows the end effector to grasp various types objects with distinct physical properties, such as mass, geometry, and surface smoothness, without the need to use different types of additional fingers, end effectors or manipulators, or to change (or switch) to another fingers, end effectors or manipulators. This is advantageous over using multiple single-modal robotic end effectors (such as by utilizing multiple manipulators installed with different single-modal end effectors or changing tools during runtime) in that the system complexity is greatly minimized and the picks per hour (PPH) is greatly enhanced. In certain embodiments, the provided end effector is fully configurable. In certain embodiments, the end effector may include different numbers of the multi-modal robotic fingers. The advantage of these embodiments is two-folded. Firstly, each suction cup is connected to the end tip of each robotic finger such as by a revolute joint, so a series of dexterous grasping motions becomes available, which introduces multiple grasping modes that facilitate grasping different types of objects. The provided end effector contains multiple degrees of freedom, which enables its dexterity and versatility. Secondly, the provided robotic fingers and end effectors are modular and customizable. Therefore, a wide range of grasping or manipulation tasks can be fulfilled by simply customizing the specific design parameters, such as the number of fingers. In summary, in certain embodiments, the provided robotic fingers and end effectors provide synergistic effects for multi-modal grasping and they are readily configurable such that they can handle diverse range of objects with enhanced picks per hour.

DETAILED DESCRIPTION

Figure 1A:
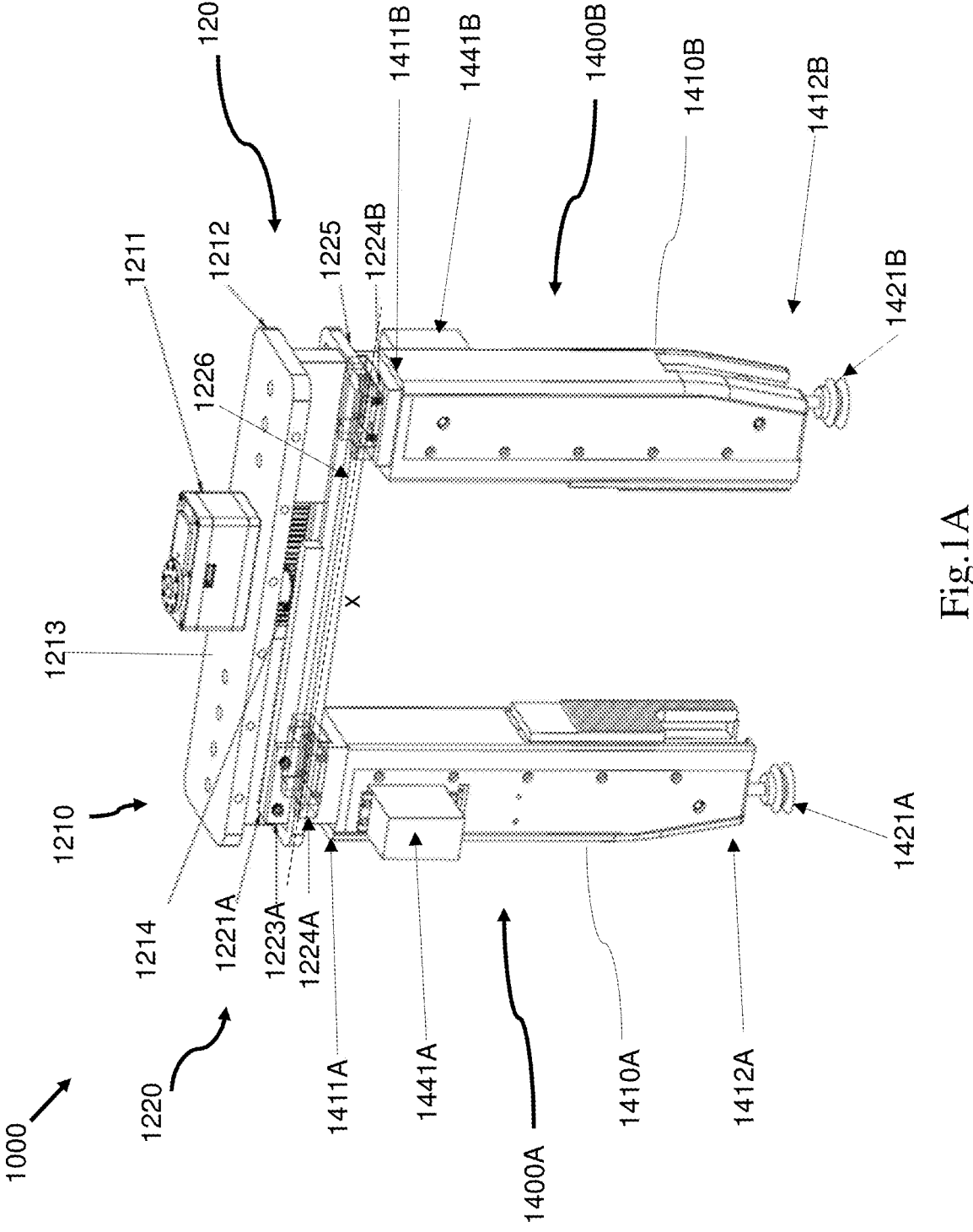
FIG. 1A is a perspective view of an example robotic end effector, according to an example embodiment.

As used herein and in the claims, the terms "comprising" (or any related form such as "comprise" and "comprises"), "including" (or any related forms such as "include" or "includes"), "containing" (or any related forms such as "contain" or "contains") or "having" (or any related forms such as "have" or "has"), means including the following elements but not excluding others. It shall be understood that for every embodiment in which the term "comprising" (or any related form such as "comprise" and "comprises"), "including" (or any related forms such as "include" or "includes"), "containing" (or any related forms such as "contain" or "contains") or "having" (or any related forms such as "have" or "has") is used, this disclosure/application also includes alternate embodiments where the term "comprising", "including,", "containing," or "having" is replaced with "consisting essentially of" or "consisting of". These alternate embodiments that use "consisting of" or "consisting essentially of" are understood to be narrower embodiments of the "comprising", "including," or "containing," embodiments.

For the sake of clarity, "comprising", including, "containing" and "having", and any related forms are open-ended terms which allows for additional elements or features beyond the named essential elements, whereas "consisting of" is a closed end term that is limited to the elements recited in the claim and excludes any element, step, or ingredient not specified in the claim.

As used herein, the term "proximal" will refer to the portion of the finger base closer to the palm and the term "distal" will refer to the portion of the finger base away from the palm.

As used herein, the term "rotatable" will refer to having the ability to rotate, for example, having the ability to perform an act, function, or operation in turn.

As used herein, the term "movable" will refer to having the ability to move, for example, having the ability to change position.

As used herein, the term "rim" will refer to the outer edge or border of a part.

It is to be understood that terms such as "top", "bottom", "middle", "side", "length", "inner", "outer", "interior", "exterior", "outside", "vertical", "horizontal" and the like as may be used herein, merely describe points of reference and do not limit the present invention to any particular orientation or configuration.

As used herein, the term "robotic end effector" or "end effector" refers to a device at the end of a robotic arm to interact with the environment, such as to grasp one or more objects.

As used herein, the term "robotic finger" or "finger" refers to a part or a digit of the robotic end effector to perform the grasping of one or more objects, usually with another one or more. In certain embodiments, the robotic finger is a jaw for grasping.

As used herein, the term "palm" refers to a part of the robotic end effector to operatively connect with one or more robotic fingers to the robotic arm.

Although the description referred to particular embodiments, the disclosure should not be construed as limited to the embodiments set forth herein.

NUMBERED EMBODIMENTS

Embodiment 1. A robotic end effector, comprising:

a palm; and a plurality of robotic fingers that are operatively connected to the palm, each finger comprising:

a finger base having a proximal end portion that is operatively connected to the palm and an opposing, distal end portion; and a suction cup, wherein each of the plurality of fingers is operatively connected to the palm at the proximal end portion and is configured to be rotatable and/or movable relative to the palm, and wherein the suction cup is configured to be movable about a pivot of the distal end portion.

Embodiment 2. The robotic end effector of embodiment 1, wherein the suction cup is connected to the distal end portion by a revolute joint.

Embodiment 3. The robotic end effector of any one of the preceding embodiments, wherein the plurality of fingers are connected to the palm by one or more joints selected from a group consisting of a prismatic joint, a revolute joint, and a hybrid joint.

Embodiment 4. The robotic end effector of any one of the preceding embodiments, wherein each finger is configured to be slidable along a transverse axis relative to the palm respectively, such that each finger can move towards and away from each other.

Embodiment 5. The robotic end effector of embodiment 4, wherein the transverse axis is substantially perpendicular to axial axis of the pivot.

Embodiment 6. The robotic end effector of any one of the preceding embodiments, wherein each finger base further comprises a clamping plate disposed at a longitudinal side of the finger base.

Embodiment 7. The robotic end effector of any one of the preceding embodiments, wherein the finger base is a rigid piece. In one embodiment, the finger base is a jaw gripper.

Embodiment 8. The robotic end effector of any one of the preceding embodiments, wherein the plurality of fingers are equidistantly spaced relative to a central longitudinal axis of the palm and configured to be movable towards and away from at least another one finger.

Embodiment 9. The robotic end effector of any one of the preceding embodiments, wherein the palm further comprising a motor assembly and;

at least one pinion-rack assembly that is operatively connected to the plurality of fingers;

wherein the motor assembly is configured to drive the pinion-rack assembly to translate and/or rotate.

Embodiment 10. The robotic end effector of any one of the preceding embodiments, wherein each finger further comprising:

a finger motor assembly;

a belt drive assembly that is operatively connected to the finger motor assembly;

a suction cup assembly that is operatively connecting the suction cup to the belt drive assembly; and a shell for supporting the finger motor assembly, the belt drive assembly and the suction cup assembly;

wherein the finger motor assembly is configured to drive the belt drive assembly so as to control rotational movement of the suction cup by the suction cup assembly.

Embodiment 11. The robotic end effector of embodiment 6, wherein the clamping plate is attached to the shell by one or more springs and/or one or more circlips.

Embodiment 12. A robotic end effector for grasping an object, comprising:

a palm; and a plurality of robotic fingers that are operatively connected to the palm to form a parallel jaw gripper, each finger comprising:

a finger base having proximal end portion that is operatively connected to the palm and an opposing, distal end portion; and a suction cup connected to the distal end portion by a revolute joint, wherein the suction cup is configured to be movable about an axial axis of a pivot of the distal end portion, wherein each of the plurality of fingers is operatively connected to the palm at the proximal end portion and is configured to be movable relative to the palm, and wherein each of the plurality of fingers is configured to be slidable along a transverse axis substantially perpendicular to the axial axis of the pivot of the corresponding suction cup.

Embodiment 13. A robotic finger for a palm of a robotic end effector, comprising a finger base having a proximal end portion that is operatively connected to the palm and an opposing, distal end portion; and a suction cup, wherein the finger base is configured to be rotatable and/or movable relative to the palm, and wherein the suction cup is configured to be movable about a pivot of the distal end portion.

Embodiment 14. The robotic finger of embodiment 13, wherein the suction cup is connected to the distal end portion by a revolute joint.

Embodiment 15. The robotic finger of any one of the preceding embodiments, wherein the robotic finger is connected to the palm by one or more joints selected from a group consisting of a prismatic joint, a revolute joint, and a hybrid joint.

Embodiment 16. The robotic finger of any one of the preceding embodiments, wherein the finger base is configured to be slidable along a transverse axis relative to the palm.

Embodiment 17. The robotic finger of embodiment 16, wherein the transverse axis is substantially perpendicular to axial axis of the pivot.

Embodiment 18. The robotic finger of any one of the preceding embodiments, further comprising a clamping plate disposed at a longitudinal side of the finger base.

Embodiment 19. The robotic finger of any one of the preceding embodiments, wherein the finger base is a rigid piece. In one embodiment, the finger base is a jaw gripper.

Embodiment 20. The robotic finger of claim 13, further comprising:

a finger motor assembly;

a belt drive assembly that is operatively connected to the finger motor assembly;

a suction cup assembly that is operatively connected to the belt drive assembly; and a shell for housing the finger motor assembly, the belt drive assembly and the suction cup assembly;

wherein the finger motor assembly is configured to drive the belt drive assembly so as to control rotational movement of the suction cup assembly.

EXAMPLES

Provided herein are examples that describe in more detail certain embodiments of the present disclosure. The examples provided herein are merely for illustrative purposes and are not meant to limit the scope of the invention in any way. All references given below and elsewhere in the present application are hereby included by reference.

Example 1

Robotic End Effector 1000

Referring now to FIG. 1A, the present disclosure provides an example robotic end effector 1000 for grasping an object. The robotic end effector 1000 generally includes a palm 1200, and two fingers 1400A and 1400B operatively connected with the palm 1200. As an example, the fingers 1400A and 1400B are connected to the palm 1200 by one or more prismatic joints, revolute joints, or hybrid joints.

The palm 1200 generally includes a motor assembly 1210 and a pinion-rack assembly 1220 operatively connected to each other. For ease of description, the direction towards the motor assembly 1210 is called top, the direction away from the motor assembly is called bottom. The motor assembly 1210 further contains a motor mounting frame 1212, a motor 1211 that is mounted on top of the motor mounting frame 1212, and a spur gear 1214 that is connected with an output shaft (not shown) of the motor 1211 by a set screw (not shown). The pinion-rack assembly 1220 further contains a front rack 1221A, a front rack fixing plate 1223A, two linear slide tables 1224A and 1224B, a slide rail mounting frame 1225 and a linear slide rail 1226 operatively connected to each other. Although not clearly shown in FIG. 1A, it is understood that the pinion-rack assembly 1220 further contains a back rack, and a back rack fixing plate (that are structurally similar to the front rack 1221A and the front rack fixing plate 1223A, respectively) at the opposing back side of the motor mounting frame 1212 for the finger 1400B. One end of the rack fixing plate 1223A is connected with the rack 1221A with screws, and the other end is connected with the linear slide table 1224A with screws. The linear slide tables 1224A and 1224B are fixed on the slide rail mounting frame 1225 through the linear slide rail 1226, and the slide rail mounting frame 1225 is fastened to the motor mounting frame 1212 with screws. The linear slide table 1224A is fixed on the slide rail mounting frame 1225 through the linear slide rail 1226, and the slide rail mounting frame 1225 is fastened to the motor mounting frame 1212 with screws. Optionally, the palm 1200 further includes a palm housing.

The finger 1400A generally contains a finger base 1410A and a suction cup 1421A. The finger base 1410A is a rigid jaw piece having a proximal end portion 1411A that is operatively connected to the palm 1200, and an opposing, distal end portion 1412A away from the palm 1200. The suction cup 1421A is operatively connected to the distal end portion of the finger base 1412A. The suction cup 1421A is controllably movable about a pivot and can provide a suction force to an object. In this example, the structure of the finger 1400B is similar to 1400A and will not be repeated for the sake of brevity. The fingers 1400A and 1400B are connected with the linear slide tables 1224A and 1224B, respectively.

The spur gear 1214 is driven by the motor 1211, and the driving force is transmitted to the racks through gear meshing. The racks will be displaced in the horizontal direction if they receive the meshing force, causing the fingers 1400A and 1400B to move. As such, in response to command signal(s), a driving force generated from the motor 1211 is converted to translational force to drive the two fingers 1440A and 1440B to move towards and away from each other at the linear slide rail 1226 along the transverse axis x, so that the fingers 1400A and 1400B can act as parallel jaw gripper to grasp or release an object. Additionally or alternatively, the fingers 1400A and 1400B can controllably provide suction force(s) by one or both of the suction cups 1421A and 1421B. The structure and mechanism of the finger (which will be generally numbered as 1400) will be described in further detail in section below and FIG. 1B.

Finger 1400

Figure 1B:
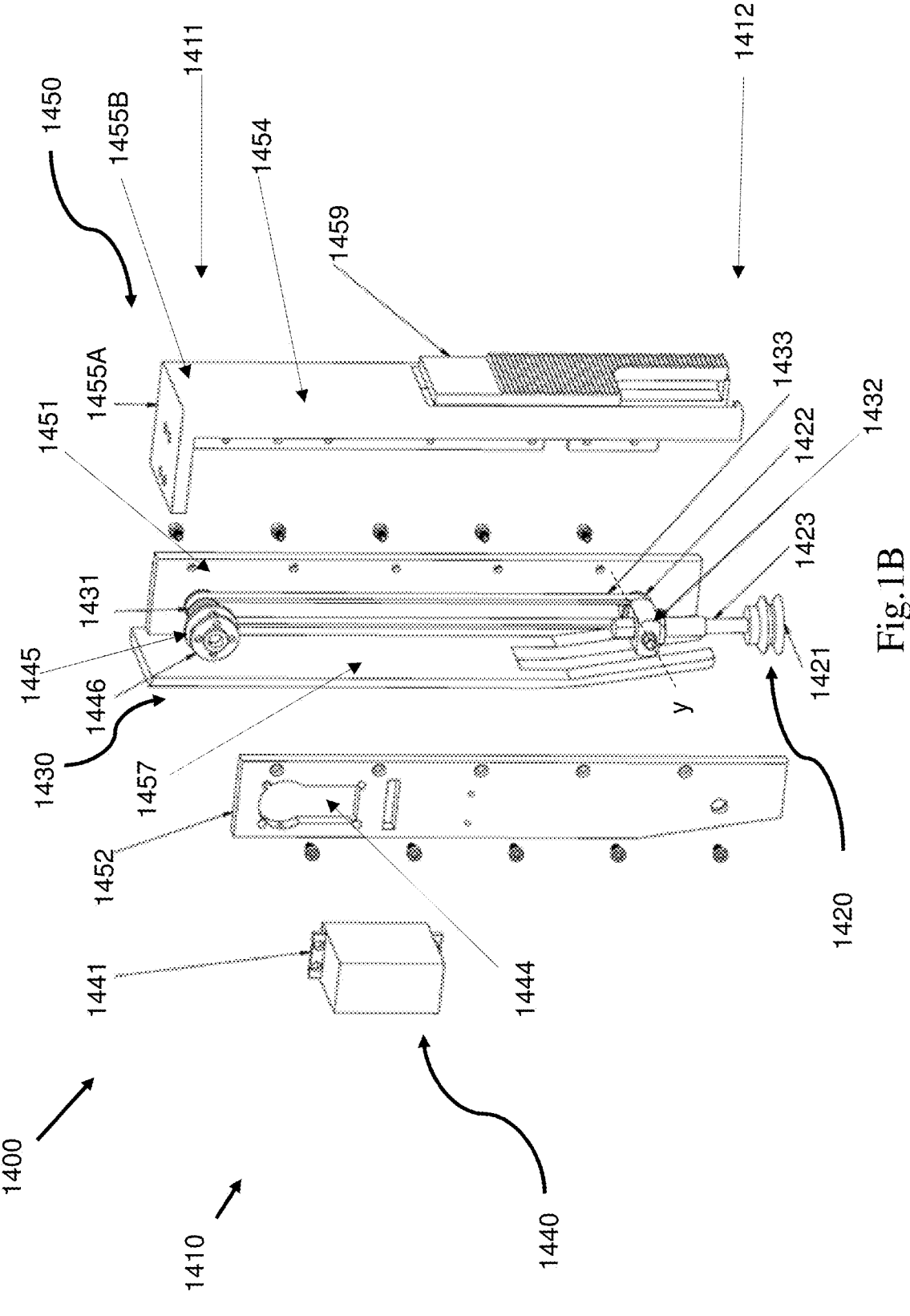
FIG. 1B is an exploded perspective view of a robotic finger of the example robotic end effector, according to the same example embodiment as shown in FIG. 1A.

Now referring to FIG. 1B, which shows the exploded schematic diagram of the modular finger 1400. The finger 1400 generally contains a finger base 1410 and a suction cup 1421. The finger base 1410 is a rigid jaw piece having a proximal end portion 1411 that is operatively connected to the palm, and an opposing, distal end portion 1412 away from the palm. The suction cup 1421A is operatively connected to the distal end portion of the finger base 1412. The finger base 1410 further contains a shell 1450, finger motor assembly 1440, a belt drive assembly 1430, and a suction cup assembly 1420 which contains the suction cup 1421. The finger motor assembly 1440, a belt drive assembly 1430, and a suction cup assembly 1420 are operatively connects with each other.

The shell 1450 generally contains a first side plate 1451, a finger motor board 1452, a fixing plate 1454, and a second side plate 1457, which are fixedly connected with each other by screws to form a support for the finger motor assembly 1440 to attach to and to form a support as well as a housing for the belt drive assembly 1430, and at least a portion of the suction cup assembly 1420. The first side plate 1451 provides support to the belt drive assembly 1430. The fixing plate 1454 is a generally L-shaped plate which contains a horizontal top portion 1455A for fixedly attaching with the linear slide table of the palm, and a vertical side portion 1455B which forms a longitudinal side of the finger base. The vertical side portion 1455B further contains a clamping plate 1459 which contains a plurality of continuous ripples to increase the surface area for grasping. Each of the second side plate 1457 and the vertical side portion 1455B of the fixing plate 1454 contains a distal end channel to allow the shaft suction cup rod rotates and extends therethrough. The fixing plate 1454 is designed with a positioning structure, which is assembled with the first side plate 1451 and the finger motor board 1452 by screws, and the clamping plate 1459 is assembled with the fixing plate 1454 by one or more springs (not shown) and/or one or more circlips (not shown) to ensure a certain degree of flexibility.

The finger motor assembly 1440 contains a finger motor 1441, an output shaft (not shown), driving shaft 1445 and flange plate 1446. The finger motor 1441 is installed on the outer surface of the finger motor board 1452 with screws, and the output shaft of the finger motor 1441 is connected to the driving shaft 1445 by the flange plate 1446 through an opening 1444 on the finger motor board 1452.

The belt drive assembly 1430 generally includes a proximal synchronous pulley 1431, a synchronous belt 1433 and a distal synchronous belt 1432 which are mounted on the inner surface of the first side plate 1451. The proximal synchronous pulley 1431 is fixed on the driving shaft 1445 by the set screw. The distal synchronous pulley 1432 was fixed on the suction cup shaft 1422 with the machine screw (or called set screw). The proximal synchronous pulley 1431 and distal synchronous pulley 1432 are operatively and synchronously connected through the synchronous belt 1433. Roller bearings of the proximal synchronous pulley 1431 and the distal synchronous pulley 1432 are assembled with the driving shaft 1445 and the suction cup shaft 1422, respectively.

The suction cup assembly 1420 contains the suction cup 1421, the suction cup shaft and the shaft suction cup buffer rod 1423. The suction cup shaft has a pivot with an axial axis y. The suction cup 1421 is connected the suction cup shaft 1422 through the shaft suction cup rod 1423 and is movable about the pivot.

Together, the driving force generated by the finger motor 1441 transmits to the driving shaft 1445 by the flange plate 1446. Through the belt drive assembly 1430, the driving force from the flange plate 1446 becomes the synchronous belt transmission movement, which causes the suction cup shaft 1422 to rotate in the same direction with the belt drive assembly 1430, and drives the parts on the shaft suction cup buffer rod 1423 and suction cup 1421, so that the suction cup 1421 can be controlled to rotate to a certain position. The shaft suction cup buffer rod 1423 and the suction cup shaft 1422 form a revolute joint that allows the suction cup 1421 to rotate and move at certain degrees about the axial axis of the pivot of the suction cup shaft 1422. The suction cup 1421 is optionally connected with a suction or vacuum source that provides suction force to the suction cup 1421.

Forward and Inverse Kinematics of Robotic End Effector 1000'

The robotic end effectors described herein contain multiple degrees of freedom, which enables outstanding dexterity and versatility. To control the robotic end effector, the forward and inverse kinematics of the example robotic end effector 1000' are derived as below.

Figure 1C:
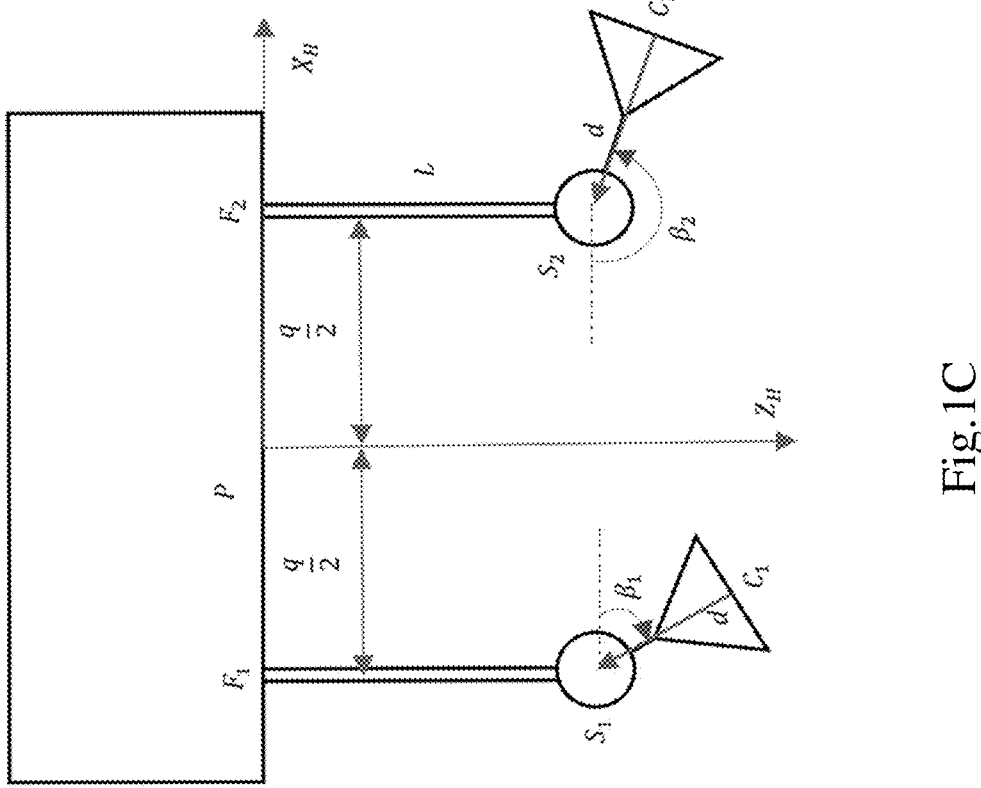
FIGS. 1C-D are schematic views of the example robotic end effector for calculation of the forward and inverse kinematics, according to the same example embodiment as shown in FIG. 1A.

Referring now to FIG. 1C, to compute the position of the endtips of two suction cups $C_1(x_{C1}, z_{C1})$, $C_2(x_{C2}, z_{C2})$, $S_1(x_{S1}, z_{S1})$, and $S_2(x_{S2}, z_{S2})$ from specified values for the joint parameters q, $\beta_1$, and $\beta_2$ with respect to the hand frame, the forward kinematics of the robotic end effector 1000' is derived.

$$\begin{cases} x_{S1} = -\dfrac{q}{2} \\ z_{S1} = L \\ x_{S2} = \dfrac{q}{2} \\ z_{S2} = L \end{cases}, \text{ and} \tag{1}$$

$$\begin{cases} x_{C1} = x_{S1} + d\cos\beta_1 \\ x_{C1} = x_{S1} + d\sin\beta_1 \\ x_{C2} = x_{S2} - d\cos\beta_1 \\ x_{C2} = x_{S2} + d\sin\beta_1 \end{cases} \tag{2}$$

Figure 1D:
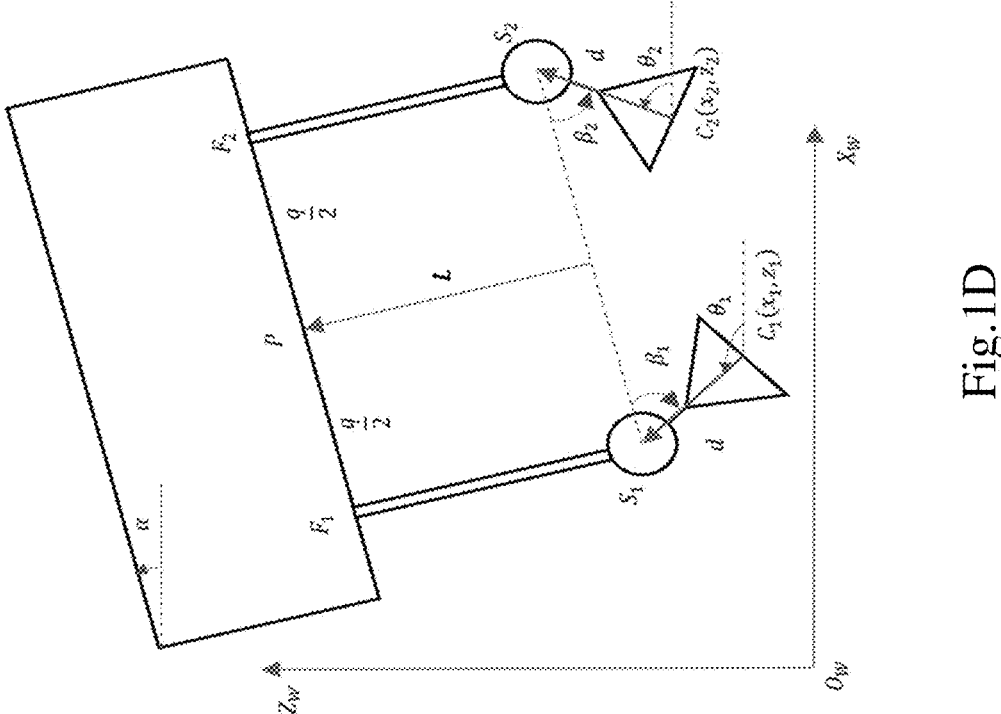
Figure 1D:
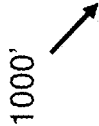

Now referring to FIG. 1D, to calculate the variable joint parameters, i.e., q, $\beta_1$, and $\beta_2$, needed to place the endtips of two suction cups in a given position, i.e., $C_1(x_1, z_1)$ and $C_2(x_2, z_2)$, and orientation, i.e., $\theta_1$ and $\theta_2$, with respect to the world frame, an inverse kinematics model has been derived $$q = \sqrt{(x_{S2} - x_{S1})^2 + (z_{S2} - z_{S1})^2} \qquad (3)$$

$$\beta_1 = \pi - \theta_1 + \alpha$$

$$\beta_2 = \theta_2 - \alpha, \text{ where}$$

$$x_{Si} = x_i + d\cos\theta_i, \, i = 1, 2 \qquad (4)$$

$$z_{Si} = z_i + d\sin\theta_i, \, i = 1, 2$$

$$\alpha = \tan^{-1}\left(\frac{z_{S2} - z_{S1}}{x_{S2} - x_{S1}}\right)$$

Under different working modes, the robotic end effector 1000' exhibits different grasping features. These grasping features allow the end effector to grasp distinct objects. In single-suction mode, the end effector exhibits the grasping features of a single suction cup, while in multiple suction mode, the end effector can exhibit grasping features of a suction cup array or multiple vacuum-based end effectors depending on the configurations of the fingertip suction cups.

In parallel-grasping mode, two robotic fingers are actuated by a motor through a pinion-rack mechanism to perform finger opening and closing. The actuation force $F_r$ on the pinion is determined by the rated torque of the motor $T_m$ and radius of the indexing ring of the pinion d by $$F_r = \frac{T_m}{d} = \frac{T_m}{MZ} \qquad (13)$$

where M is the module of the pinion and Z is the number of the teeth of the pinion. Take into account of efficiency of the rack and the pinion, the effective force on the pinion is $$F'_r = E_r F_r \qquad (14)$$

When holding an object using two fingers under parallel-grasping mode, the upper bound of the object weight is $$L = 2F_f = 2\mu F_n = 2\mu F'_r \qquad (15)$$

The parameters selected were summarized in Table 1 for the prototype, and the resulting maximum load is 12.4 kg and the specified load is 8.3 kg.

TABLE 1

| Design parameters for the prototype. | |
| --- | --- |
| Parameters | Values |
| M | 1 mm |
| $T_m$ | 20 kg · cm |
| $E_r$ | 97% |
| μ | 0.64 |

Example 2

Figure 2:
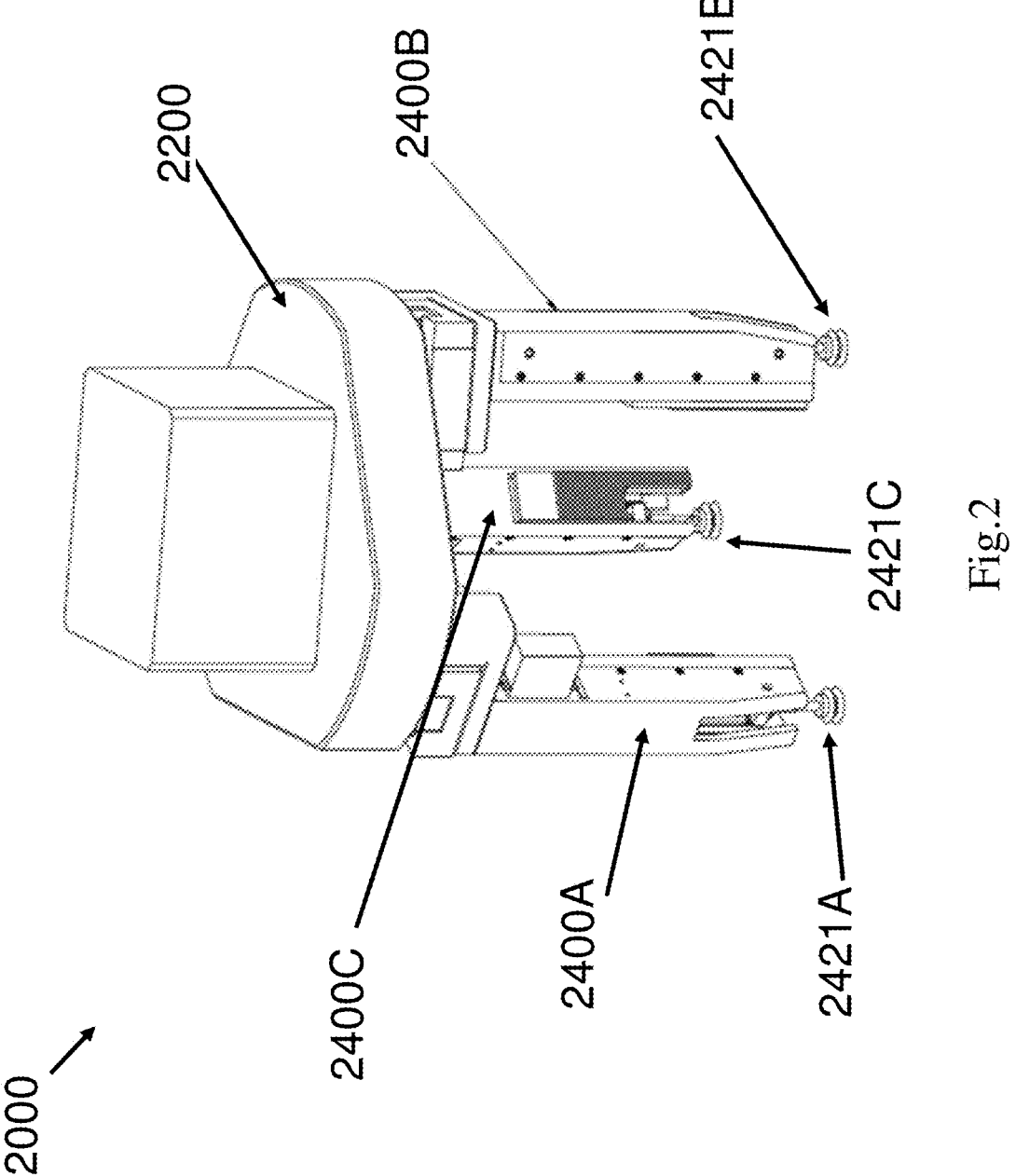
FIG. 2 is a perspective view of an example robotic end effector having three robotic fingers, according to another example embodiment.

Referring now to FIG. 2, another example robotic end effector 2000 is shown. The robotic end effector 2000 is structurally similar to the robotic end effector 1000 described in Example 1, but the robotic end effector 2000 has three robotic fingers 2400A, 2400B and 2400C connecting to a palm 2200. The fingers 2400A, 2400B and 2400C are generally equidistantly spaced relative to a central longitudinal axis of the palm and configured to be movable towards and away from each other. The clamping plates are configured to face towards the central longitudinal axis. Each of the robotic fingers contains a corresponding suction cup 2421A, 2421B and 2421C and the suction cups can move about their respective pivots and work independently or cooperatively.

Example 3

Figure 3:
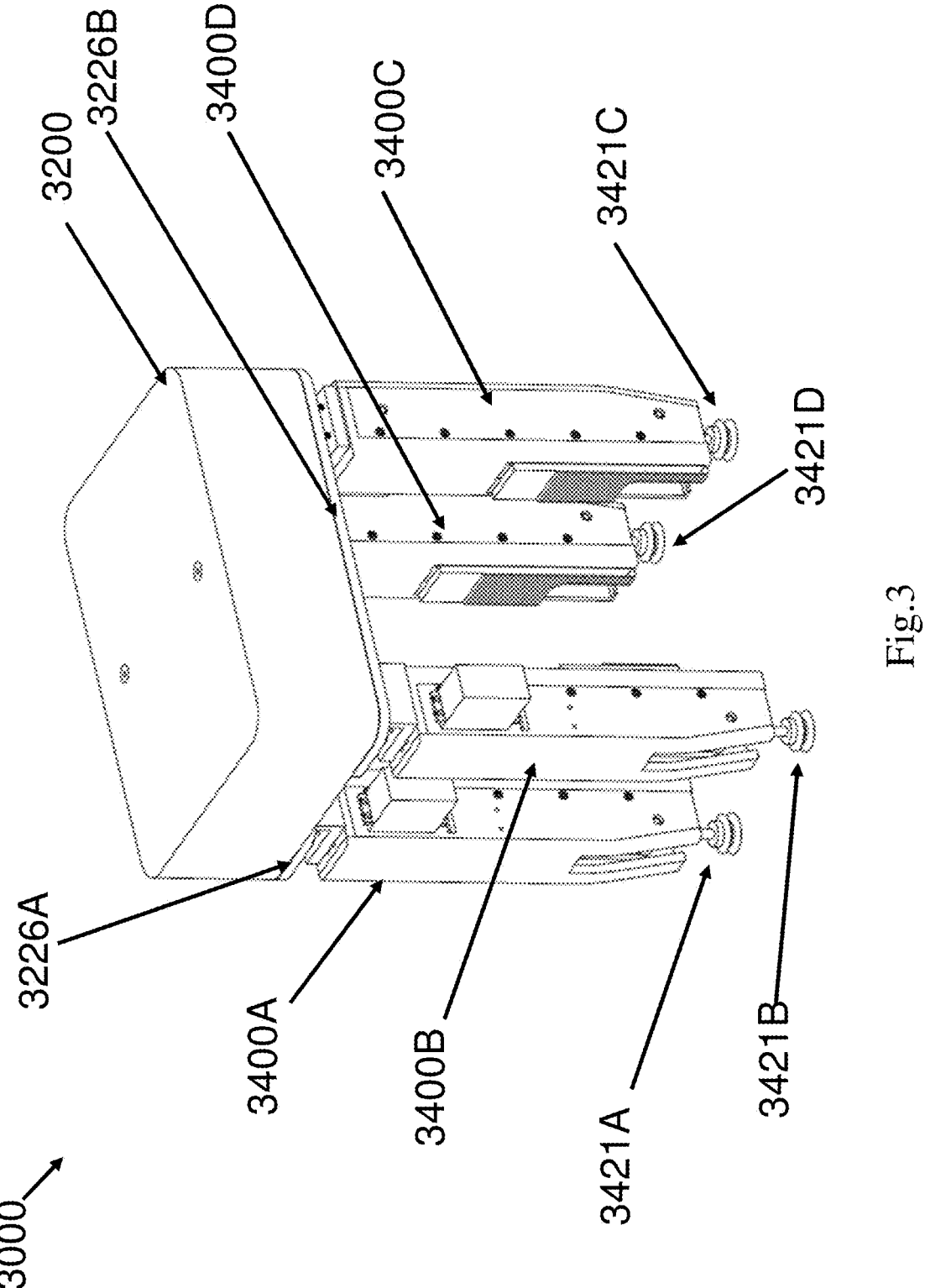
FIG. 3 is a perspective view of an example robotic end effector having four robotic fingers, according to another example embodiment.

Referring now to FIG. 3, another example robotic end effector 3000 is shown. The robotic end effector 3000 is structurally similar to the robotic end effector 1000 described in Example 1, but the robotic end effector 3000 has four robotic fingers 3400A, 3400B, 3400C and 3400D connecting to a rounded rectangular palm 3200. In this example, the fingers 3400A, 3400B, 3400C and 3400D are connected with two pinion-rack assemblies (first and second pinion-rack assemblies) and arranged as two pairs of jaw grippers. The finger 3400A and finger 3400D are connected with a first pinion-rack assembly such that they can move towards and away from each other along the first linear slide rail 3226A along a first transverse axis, and the finger 3400B and finger 3400C are connected with a second pinion-rack assembly such that they can move towards and away from each other along the second linear slide rail 3226B along a second transverse axis. The first transverse axis and second transverse axis are generally parallel to each other. The clamping plate of the finger 3400A is facing towards the clamping plate of the finger 3400D, and the clamping plate of the finger 3400B is facing towards the clamping plate of the finger 3400C. The robotic fingers 3400A, 3400B, 3400C and 3400D contain a corresponding suction cups 3421A, 3421B, 3421C and 3421D and the suction cups can rotate about their respective pivots and work independently or cooperatively.

Example 4

Referring now to FIGS. 4A-4K, as an example, the example robotic end effector 4000 which contains two fingers and a palm can operate in at least the following multiple grasping modes:

1. Parallel Grasping Mode

Figure 4B:
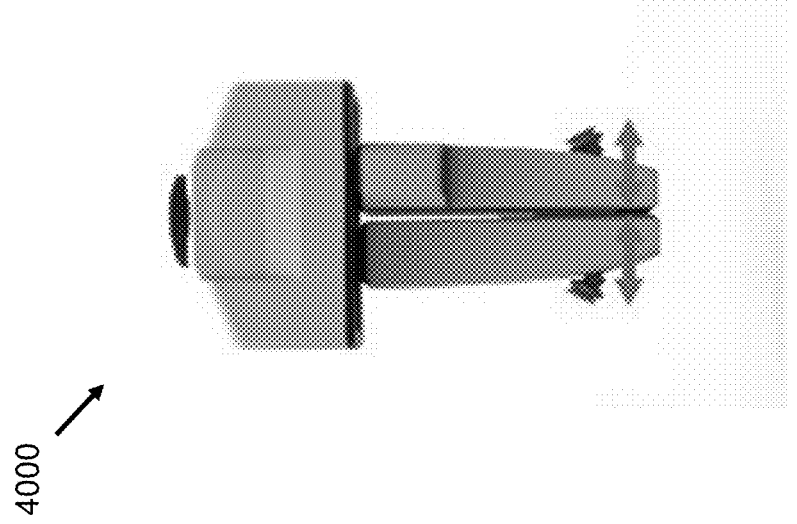
FIGS. 4A and 4B are two perspective side views of the example robotic end effector, showing degrees of freedom of the suction cup and the motion range of the finger base of the example robotic end effector, respectively, according an example embodiment.
Figure 4A:
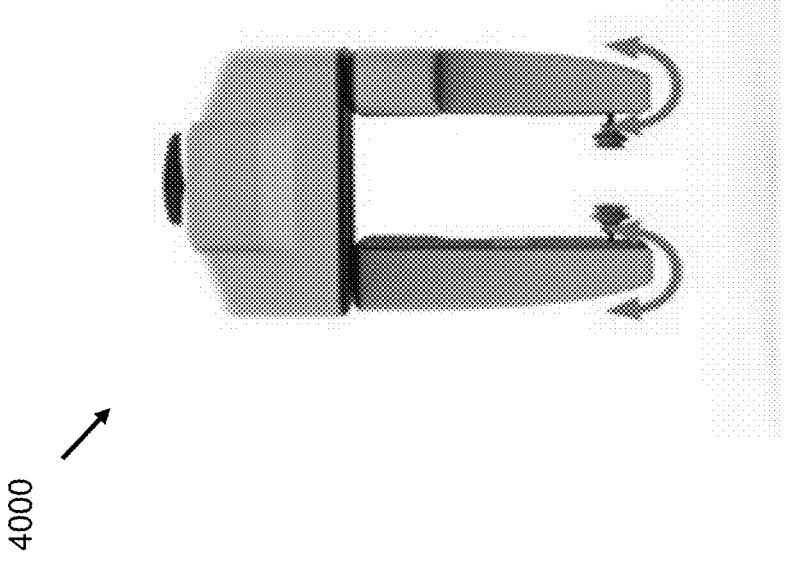
Figures 4C, 4D:
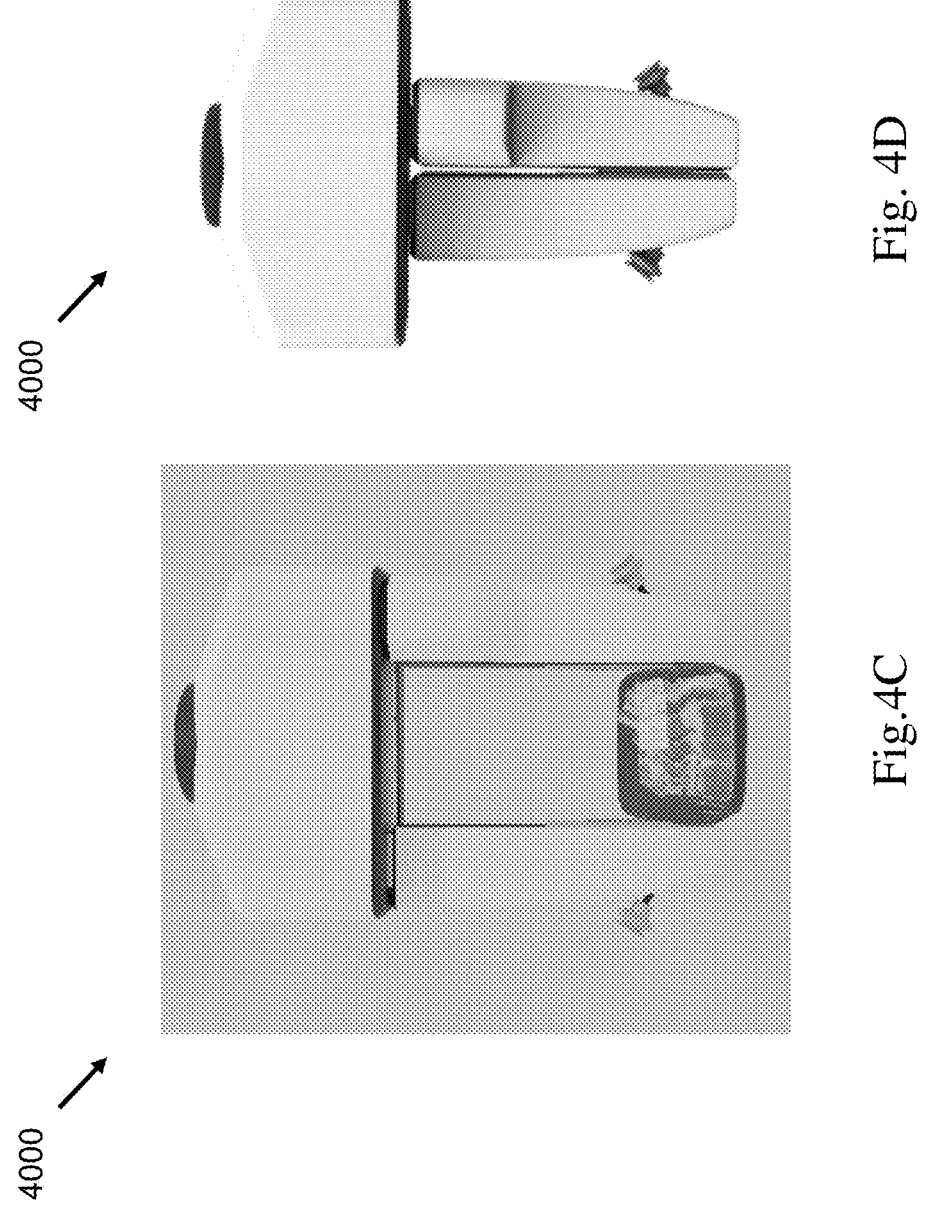
FIGS. 4C and 4D are two perspective side views of the example robotic end effector (with and without grasping an object) in an example parallel grasping mode, according to the same example embodiment as shown in FIG. 4A.

As seen in FIGS. 4A-4D, the robotic finger acts as a parallel jaw gripper. The arrows in FIG. 4A show degrees of rotation of the suction cup and the arrows in FIG. 4B shows the translational motion range of the two fingers. The two fingers open and close synchronously to perform antipodal grasping. Under this grasping mode, the robotic finger can effectively grasp one or more objects with non-suckable surfaces. Two suction cups are retracted to avoid potential collision between environments and the suction cups, as shown in FIGS. 4C and 4D.

2. Single-Suction Mode

Figure 4E:
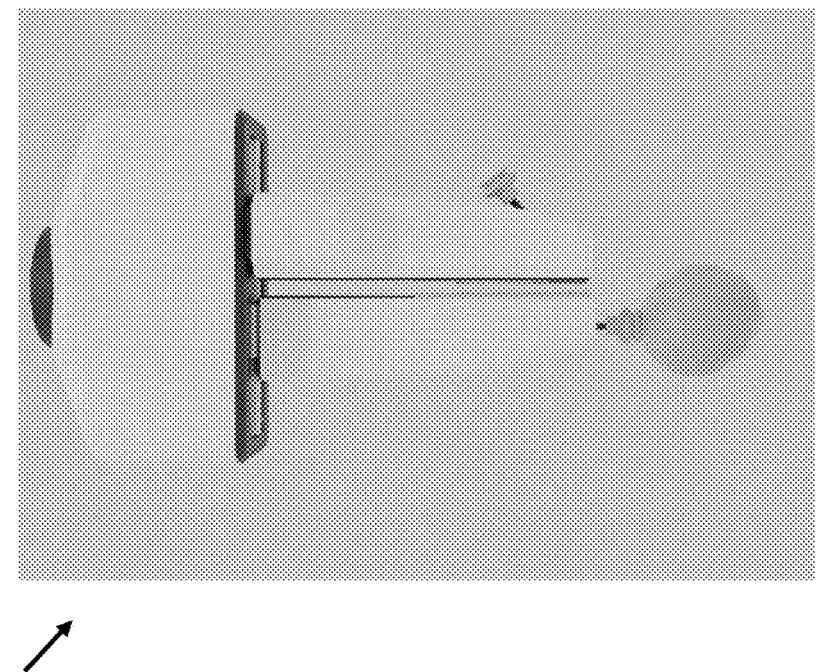
FIG. 4E is a perspective side view of the example robotic end effector in example single-suction mode, according to the same example embodiment as shown in FIG. 4A.

As seen in FIG. 4E, in single-suction mode, any one of the robotic fingers can act as a suction cup gripper. Only one of the two suction cups are active, while the other can be retracted. This grasping mode is designed for small and light objects with surfaces that can form a vacuum seal. In this mode, the configuration of the robotic end effector keeps unchanged. In other words, the opening width between the fingers can be fixed.

US 12,654,337 B2

11

3. Multiple-Suction Mode

Figures 4F, 4G, 4H:
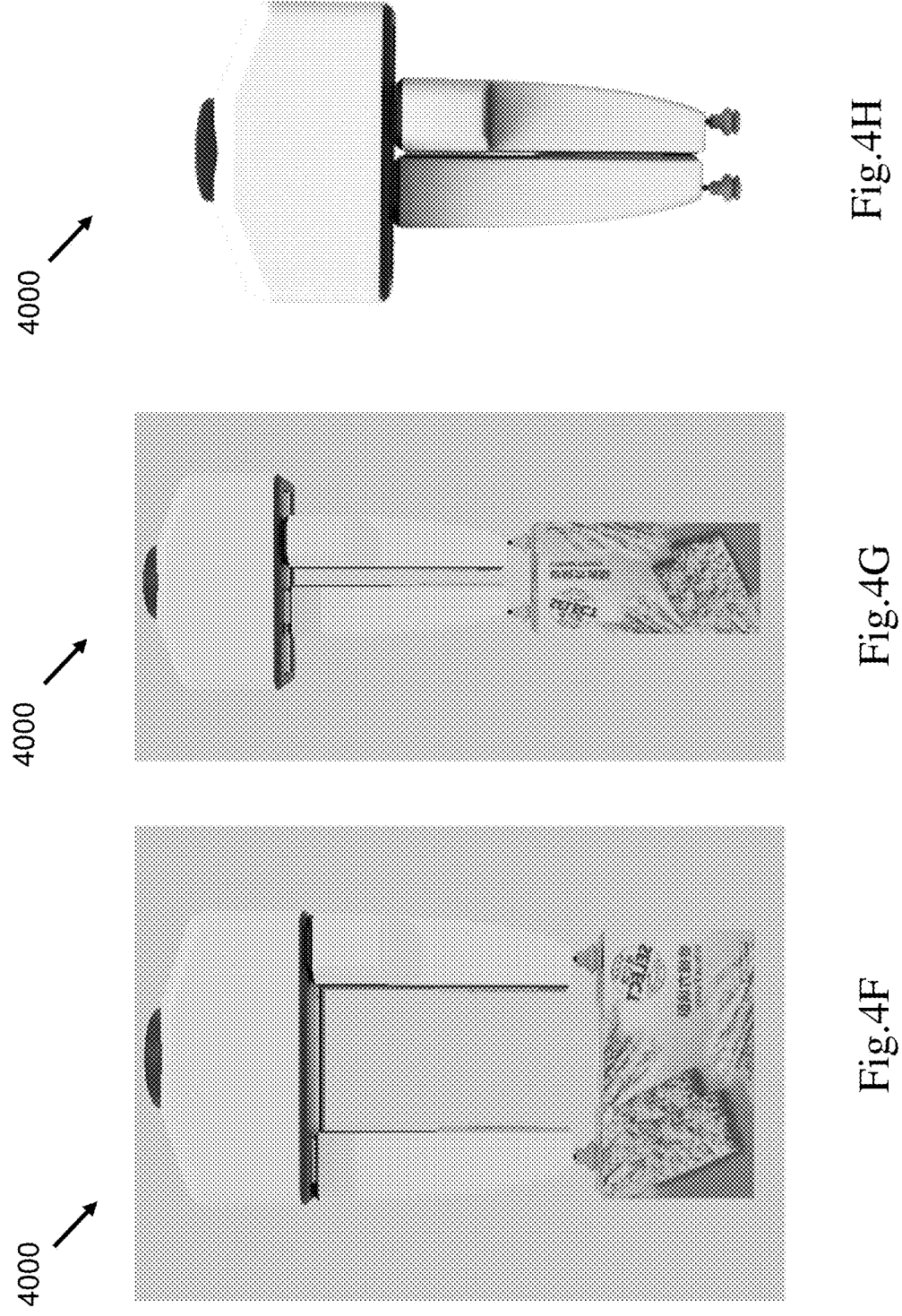
FIGS. 4F-4H are three perspective side views of the example robotic end effector with fingers in different positions in an example multiple-suction mode, according to the same example embodiment as shown in FIG. 4A.

As seen in FIG. 4F-4H, in multiple-suction mode, both of the two (all) suction cups are active. This mode is designed for larger and heavier objects with surfaces that can form a vacuum seal. Different from the single-suction mode, the multiple-suction mode allows the configuration of the robotic end effector to change. In other words, the opening width between the fingers can be varied and adjusted according to different sizes and shapes of the object.

4. Pinching-with-Suction Mode

Figure 4J:
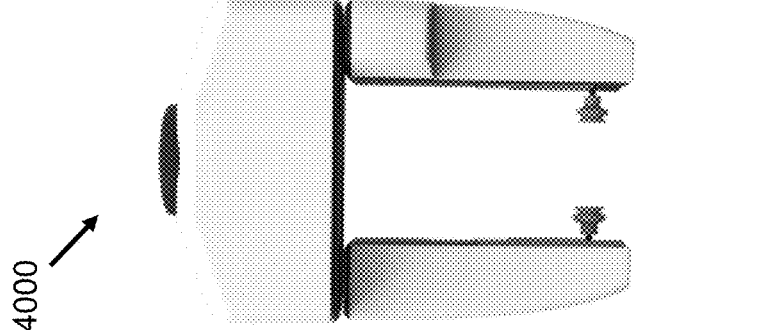
FIGS. 4I-4J are two perspective side views of the example robotic end effector (with and without grasping an object) in an example pinching-with-suction mode, according to the same example embodiment as shown in FIG. 4A.
Figure 4I:
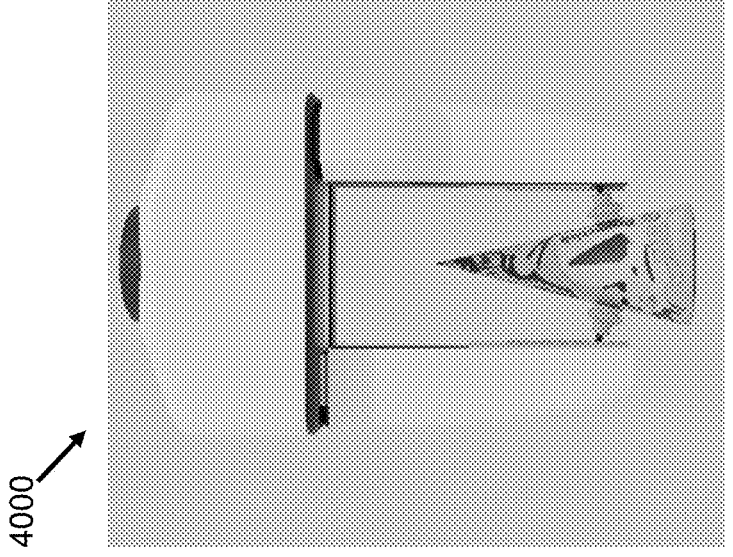

As seen in FIGS. 4I and 4J, in pinching-with-suction mode, the opening width between the fingers, and the orientation of two suction cups can be varied and adjusted according to specific sizes and shapes of the object. This grasping mode is designed for objects with a generally cone shape, tetrahedron shape, or other more complex irregular shapes. After setting of the orientation of the suction cups, two fingers may get close to each other until making contact with the object surface.

5. Unpinching-with-Suction Mode

Figure 4K:
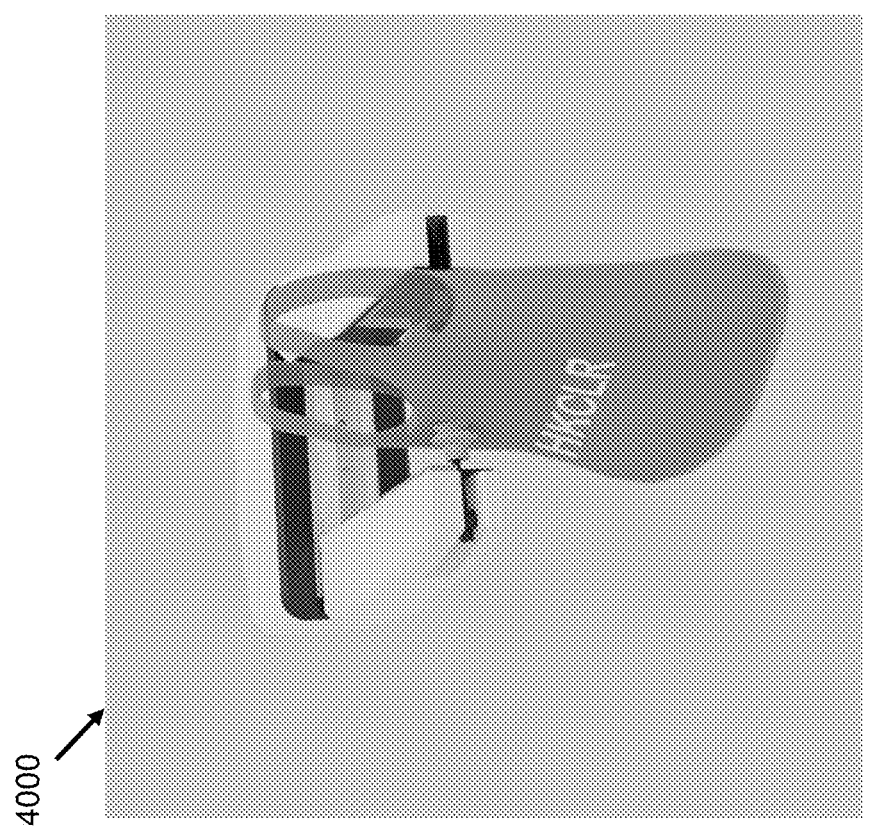
FIG. 4K is a perspective view of the example robotic end effector in an example unpinching-with-suction mode, according to the same example embodiment as shown in FIG. 4A.

As shown in FIG. 4K, the unpinching-with-suction mode is designed for a set of manipulation tasks. One example is opening and holding a plastic bag so that a user or another robot can put objects or items into the opened bag. These kinds of tasks are particularly helpful to automate checkout and packaging objects in e-commerce applications.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, in certain embodiments, each of the robotic end effector comprises a singular rectangular palm, but other numbers (e.g., two, three, four, five, six, seven, eight, nine, ten or more), sizes (e.g. oversized) and shapes (oval, circular triangular) at various locations may be used.

For example, in certain embodiments, the robotic end effector comprises two generally cuboid shaped robotic fingers, but other numbers (e.g., three, four, five, six, seven, eight, nine, ten or more), sizes (e.g. oversized) and shapes (cylindrical, conical, triangular prismatic, pentagonal prismatic) at various locations may be used.

For example, in certain embodiments, the robotic fingers of a robotic end effectors are structurally the same, but different types, sizes (e.g. oversized) and shapes (oval, rectangular, triangular) at various locations may be used.

For example, in certain embodiments, each of the robotic finger comprises a circular or disc shaped endtip of the suction cup, but other numbers (e.g., two, three, four, five, six, seven, eight, nine, ten or more), sizes (e.g. oversized) and shapes (oval, rectangular, triangular) of endtips and suction cups at various locations may be used.

For example, in certain embodiments, the suction cup moves by the belt transmission movement of the belt drive assembly, but other forms of drive mechanisms (e.g. gear mechanism, slider crank mechanism) may be used.

For example, in certain embodiments, the sliding motion of robotic fingers is actuated by the pinion-rack action of the pinion-rack assembly, but other forms of linear or non-linear actuating mechanisms (e.g. belt drive actuator, pneumatic actuator, etc) may be used.

For example, in certain embodiments, each of the plurality of fingers is configured to be movable along a transverse axis, but may be configured to be movable along multiple directions and axes according to the practical need.

For example, in certain embodiments, each of the plurality of fingers is configured to be movable relative to the palm, but alternatively or additionally can be configured to be rotatable to adjust the angle of grasping.

For example, in Example 4 as illustrated in FIGS. 4A-4K describes the multiple grasping modes of the example robotic end effector 4000 containing two robotic fingers, but it is understood that other configurations (such as with different numbers of fingers (e.g., three, four, five, six, seven, eight, nine, ten or more)) will also achieve at least the above mentioned multiple grasping modes.

For example, the end effectors described herein can further comprise an imaging device or system (such as a camera) for recording, detecting the motion of the end effectors, respectively.

What is claimed is:

1. A robotic end effector, comprising:
a palm; and
a plurality of robotic fingers that are operatively connected to the palm, each finger comprising:
a finger base having a proximal end portion that is operatively connected to the palm and an opposing, distal end portion; and
a suction cup,
wherein each of the plurality of fingers is operatively connected to the palm at the proximal end portion and is configured to be rotatable and/or movable relative to the palm, and
wherein the suction cup is configured to be movable about a pivot of the distal end portion,
wherein the plurality of fingers are operatively connected to the palm by one or more joints selected from a group consisting of a prismatic joint, a revolute joint, and a hybrid joint, and
wherein each finger is configured to be slidable along a transverse axis relative to the palm respectively, such that each finger can move towards and away from each other.

2. The robotic end effector of claim 1, wherein the suction cup is connected to the distal end portion by a revolute joint.

3. The robotic end effector of claim 1, wherein the transverse axis is substantially perpendicular to axial axis of the pivot.

4. The robotic end effector of claim 1, wherein each finger base further comprises a clamping plate disposed at a longitudinal side of the finger base.

5. The robotic end effector of claim 1, wherein the finger base is a rigid piece.

6. The robotic end effector of claim 1, wherein the plurality of fingers are equidistantly spaced relative to a central longitudinal axis of the palm and configured to be movable towards and away from at least another one finger.

7. The robotic end effector of claim 1, wherein the palm further comprising
a motor assembly and;
at least one pinion-rack assembly that is operatively connected to the plurality of fingers;
wherein the motor assembly further comprises a motor and a spur gear,
wherein the motor assembly is configured to drive the pinion-rack assembly to translate and/or rotate by the motor driving the spur gear to transmit driving force to the pinion-rack assembly.

8. The robotic end effector of claim 1, wherein each finger further comprising:

a finger motor assembly;

a belt drive assembly that is operatively connected to the finger motor assembly;

a suction cup assembly that is operatively connecting the suction cup to the belt drive assembly; and a shell for supporting the finger motor assembly, the belt drive assembly and the suction cup assembly;

wherein the finger motor assembly is configured to drive the belt drive assembly so as to control rotational movement of the suction cup by the suction cup assembly.

9. The robotic end effector of claim 8, wherein each finger base further comprises a clamping plate disposed at a longitudinal side of the finger base, and wherein the clamping plate is attached to the shell by one or more springs and/or one or more circlips.

10. A robotic end effector for grasping an object, comprising:

a palm; and a plurality of robotic fingers that are operatively connected to the palm to form a parallel jaw gripper, each finger comprising:

a finger base having proximal end portion that is operatively connected to the palm and an opposing, distal end portion; and a suction cup connected to the distal end portion by a revolute joint, wherein the suction cup is configured to be movable about an axial axis of a pivot of the distal end portion, wherein each of the plurality of fingers is operatively connected to the palm at the proximal end portion by one or more joints selected from a group consisting of a prismatic joint, a revolute joint, and a hybrid joint and is configured to be movable relative to the palm, wherein each of the plurality of fingers is configured to be slidable along a transverse axis substantially perpendicular to the axial axis of the pivot of the distal end portion, and

wherein each finger is configured to be slidable along a transverse axis relative to the palm respectively, such that each finger can move towards and away from each other.

11. A robotic finger for a palm of a robotic end effector, comprising a finger base having a proximal end portion that is operatively connected to the palm and an opposing, distal end portion; and a suction cup, a finger motor assembly, a belt drive assembly that is operatively connected to the finger motor assembly, a suction cup assembly that is operatively connected to the belt drive assembly, and a shell for housing the finger motor assembly, the belt drive assembly and the suction cup assembly;

wherein the finger motor assembly is configured to drive the belt drive assembly so as to control rotational movement of the suction cup assembly, wherein the finger base is configured to be rotatable and/or movable relative to the palm, and wherein the suction cup is configured to be movable about a pivot of the distal end portion, and wherein the robotic finger is operatively connected to the palm by one or more joints selected from a group consisting of a prismatic joint, a revolute joint, and a hybrid joint.

12. The robotic finger of claim 11, wherein the suction cup is connected to the distal end portion by a revolute joint.

13. The robotic finger of claim 11, wherein the finger base is configured to be slidable along a transverse axis relative to the palm.

14. The robotic finger of claim 11, further comprising a clamping plate disposed at a longitudinal side of the finger base.

15. The robotic finger of claim 11, wherein the finger base is a rigid piece.

16. The robotic finger of claim 13, wherein the transverse axis is substantially perpendicular to axial axis of the pivot.

* * * * *